Jan. 13, 1970  N. A. DE BRUYNE  3,489,343
LOGIC DEVICES

Filed June 20, 1967  4 Sheets-Sheet 2

INVENTOR
NORMAN ADRIAN DE BRUYNE
BY Greene & Durr
ATTORNEY

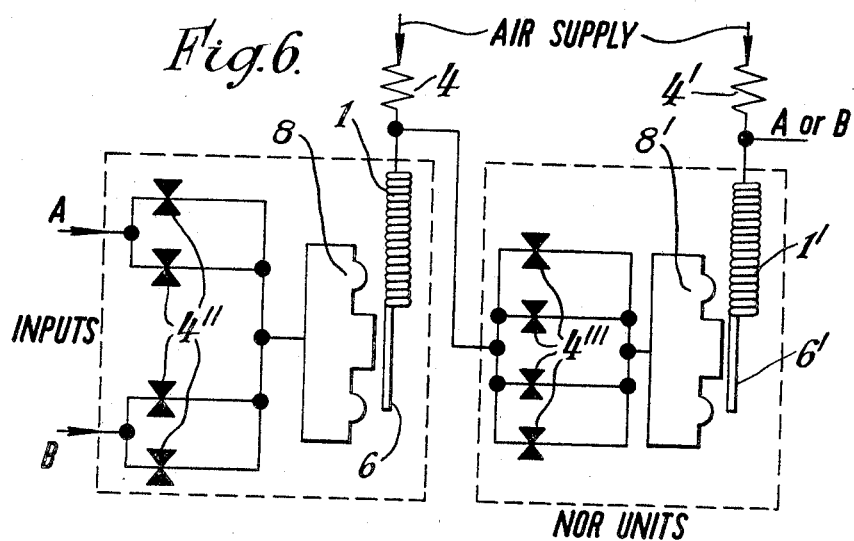
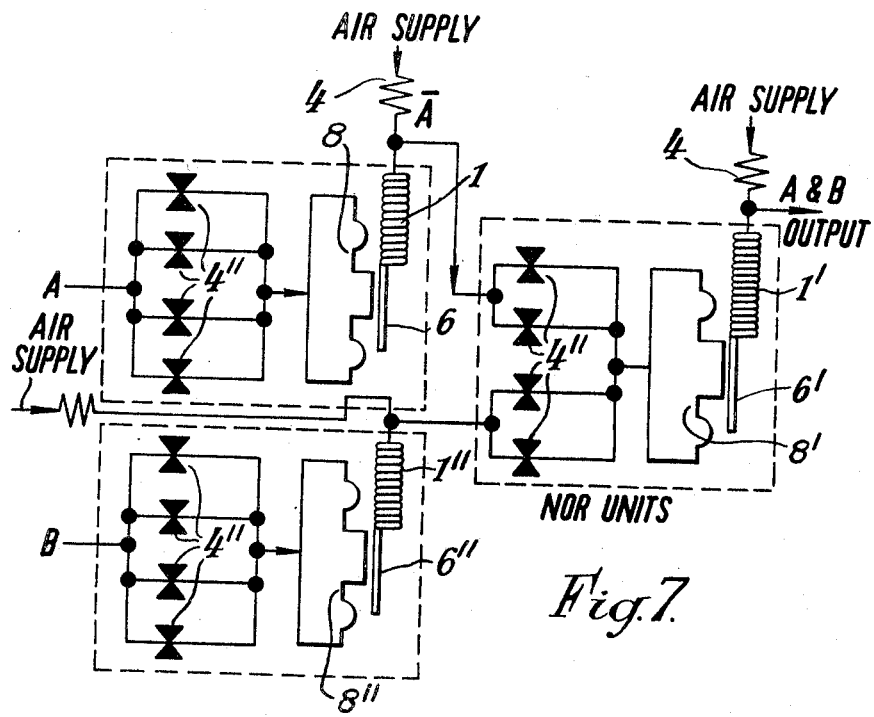

Jan. 13, 1970   N. A. DE BRUYNE   3,489,343
LOGIC DEVICES

Filed June 20, 1967   4 Sheets-Sheet 4

INVENTOR
NORMAN ADRIAN DE BRUYNE
BY
*Drews & Durr*
ATTORNEY

United States Patent Office 3,489,343
Patented Jan. 13, 1970

3,489,343
LOGIC DEVICES

Norman Adrian De Bruyne, Pyne's House,
Duxford, England
Continuation-in-part of application Ser. No. 521,303,
Jan. 18, 1966. This application June 20, 1967, Ser.
No. 647,359
Int. Cl. G06m 1/12; G06d 1/00
U.S. Cl. 235—201                                7 Claims

ABSTRACT OF THE DISCLOSURE

This invention relates to fluid actuated logic elements in which a flexible diaphragm is located within and arranged to close a chamber having one or more fluid inlet connections formed on one side of the diaphragm, the other side of the diaphragm having coupled thereto a closely wound helical spring closed at one end and open at the other end which is connected to a source of fluid supply, the arrangement being such that any change in the pressure of the fluid applied to any one or more of the inlet connections causes deformation of the diaphragm and consequent deflection of the spring to produce a fluid pressure outlet signal in an outlet connection leading from the spring.

---

This application is a continuation-in-part of my U.S application Ser. No. 521,303 filed Jan. 18, 1966, now abandoned.

This invention relates to fluid valve logic elements and the logic element forming the subject of the present invention has been designed for use where speed of operation is not of paramount importance but simplicity and reliability are essential, the logic element being fluid actuated for example by air pressure and serving communicate an input signal in the form of a pressure pulse in a fluid control circuit or circuits to an output fluid circuit or circuits to produce a change in internal pressure in the output circuit or circuits and constitute an output signal on a magnified scale.

A fluid actuated logic element in accordance with the present invention comprises a casing containing a flexible diaphragm or the like closing a chamber having one or more inlet connections for the entry of fluid at a predetermined pressure and via one or more restrictions and one or more control valves in said casing, each in the form of a closely wound helical spring closed at one end and open at the other end for the entry of fluid at a predetermined pressure via a restrictor, the spring or springs being so positioned relatively to said diaphragm as to be lateraly deflected to open their convolutions as a result of deflection of the diaphragm consequent upon one of the inlet connections receiving an input signal in the form of a fluid pressure pulse, to thereby, due to deflection and opening of the convolutions of a spring, produce a change in internal pressure in said spring constituting an amplified output signal in a branch outlet connection leading from said spring.

The change in pressure in the fluid control valve circuit or circuits will generally be an increase in pressure, but it is within the scope of the invention to employ a circuit in which the controlling change in pressure is in fact a reduction in pressure for example a pressure drop below atmospheric pressure.

Although suitable for use in building up a complicated data processing system or computer, the logic element in accordance with the present invention has been designed for inclusion in a comparatively simple system in which high speed of operation is not necessary but simplicity and reliability in operation are more important.

Referring to the accompanying drawings.

Figure 3:
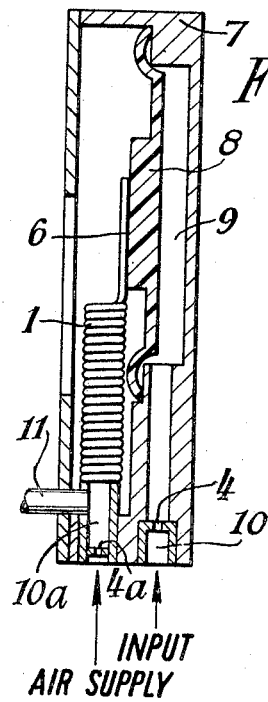
Figure 4:
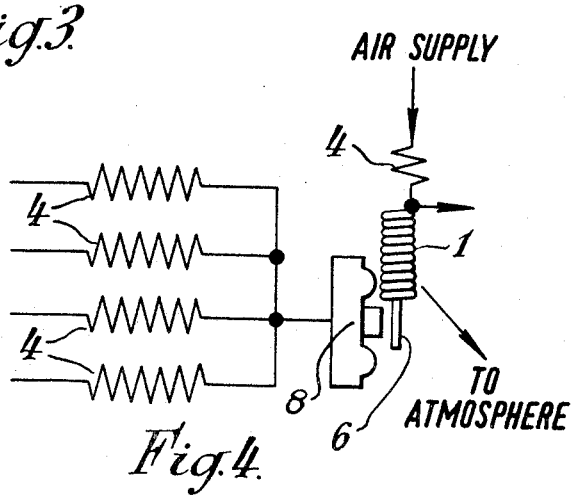
FIGURE 4 is a diagrammatic representation of the "NOR" unit of FIGURE 3.
Figure 5:
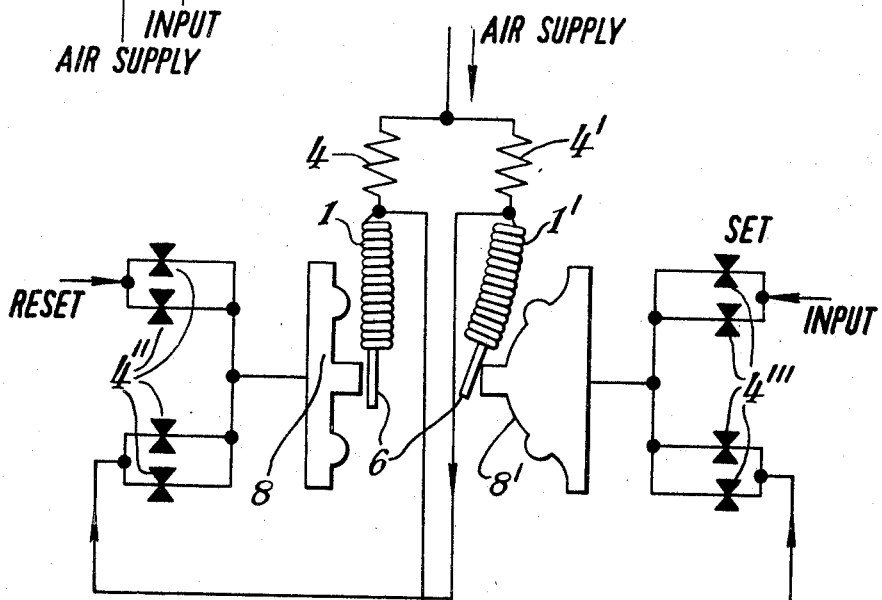
Figure 10:
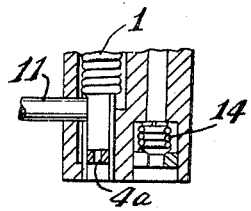
Figure 8:
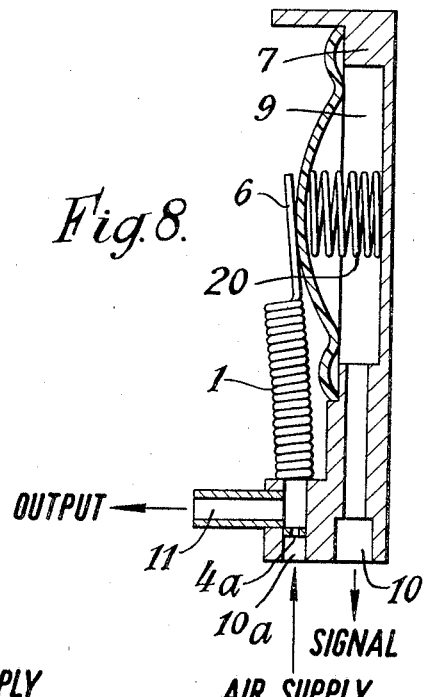
Figure 9:
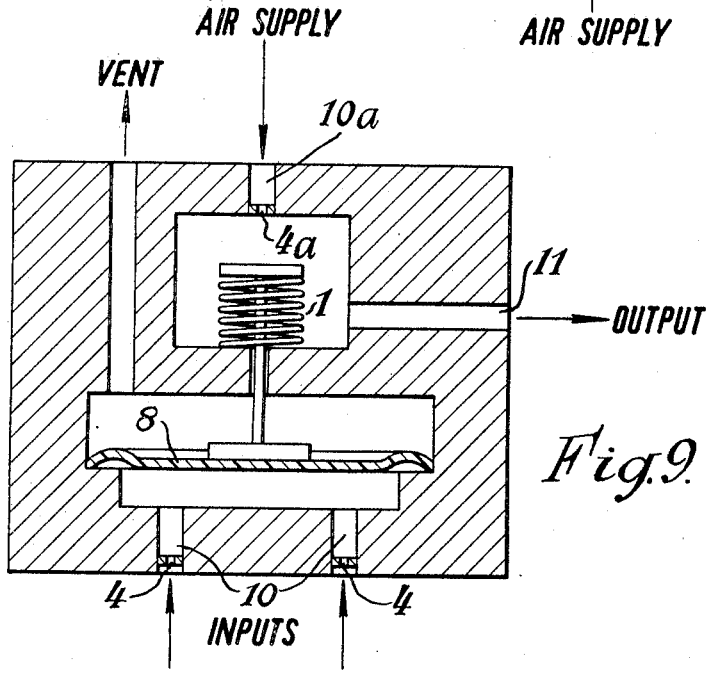

FIGURES 5 to 7 ilustrate diagrammatically combinations of logic elements forming a flip-flop, "OR" gate and "AND" gate respectively;

FIGURE 8 is a sectional view of a logic element where a fall in pressure constitutes the input signal;

FIGURE 9 is a sectional view of a logic element where an axial deformation of a helical spring occurs in response to the application of an input signal, and FIGURE 10 is view similar to FIG. 3, but partially cut away, showing a modified form of device.

Figure 1:
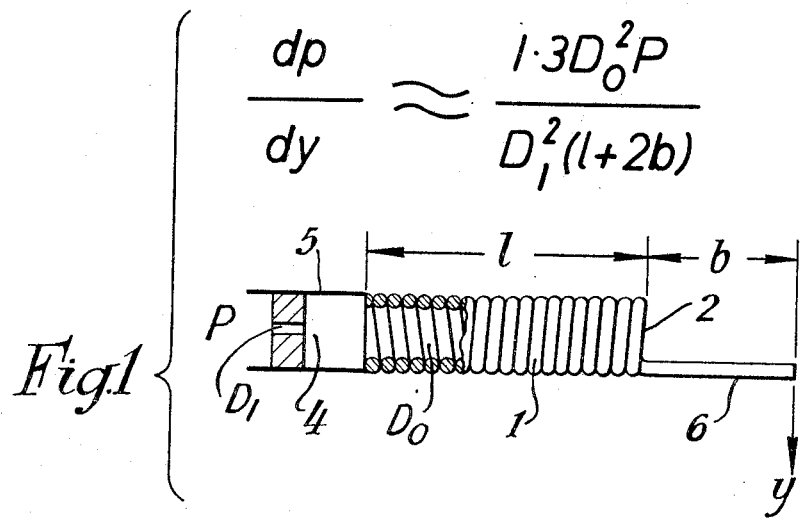
FIGURE 1 is a fragmentary side elevation of a fluid control valve for incorporation into a logic element in accordance with the invention.

Referring in the first case to FIGURE 1, the valve takes the form of a closely wound helical spring 1, the spring closed at the end 2 but open at its opposite end 3, end 3 containing a restriction to fluid flow indicated by reference numeral 4. The spring is shown attached to a short length of tube 5 containing the restriction.

The spring may conveniently be wound from stainless steel wire, the convolutions being closed to prevent the escape of fluid therebetween unless the spring is deflected laterally to cause separation of the convolutions on one side. If, therefore, the spring is subjected to an internal fluid pressure, the convolutions will normally remain closed, thus preventing a loss of pressure.

The spring is shown fitted with a short arm 6 which as shown in FIGURES 2 to 7 can be acted upon by a diaphragm to produce a lateral deflection of the spring with consequential separation of the convolutions on a signal pulse being applied to the diaphragm.

Figure 2:
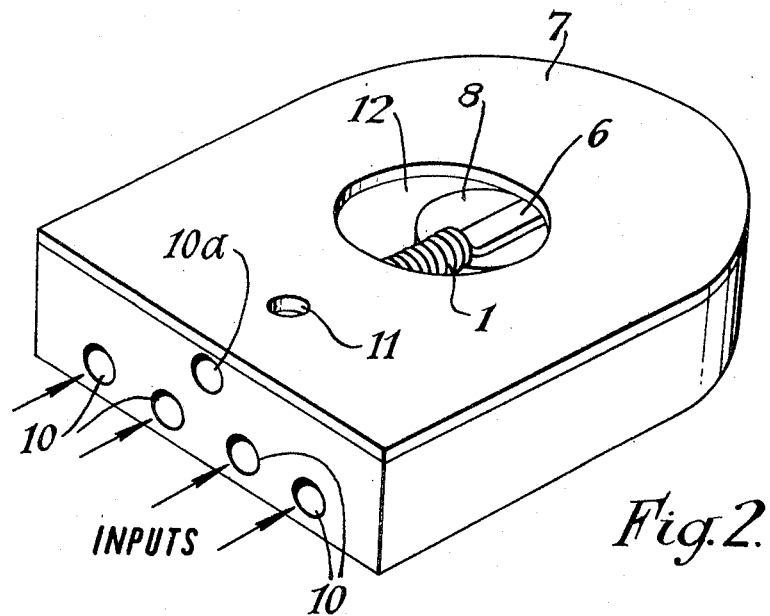
FIGURES 2 and 3 are respectively a perspective view and a sectional view of a "NOR" unit incorporating a control valve as shown in FIGURE 1.

FIGURE 2 and 3 illustrate a simple "NOR" unit incorporating for simplicity of illustration one valve as shown in FIGURE 1, a number of such units being suitable for assembly together if desired as shown in FIGURES 5, 6 or 7, FIGURE 4 depicting the unit and its various connections diagrammatically.

The unit includes a casing 7 fitted with a neoprene diaphragm 8 closing a chamber 9, the latter being in connection with a series of fluid pressure inlet openings 10, four openings being in this case provided supplied with pressure fluid normally insufficient to deflect to diaphragm. On an increase in fluid pressure in any circuit leading to any one of the openings occurring and representing an input signal, the diaphragm will be deflected. A restriction 4 to fluid flow is incorporated into each opening 10.

The valve 1 is supplied with fluid under pressure via a pressure supply opening 10a and via a restriction 4a. The valve has an output connection shown as an opening 11 downstream of the restriction 4a for connection with an output circuit. Normally opening 11 will be situated in the end of the casing but is shown in FIGURES 2 and 3 for convenience of illustration as a laterally arranged branch opening.

It will be appreciated therefore that an increase in fluid pressure in any one of the openings 10 sufficient to deflect the diaphragm, such increase in pressure constituting an input signal, will result in the diaphragm bearing on the arm 6 and deflecting the valve laterally to open the convolutions and product a drop in pressure in the output opening 11 to provide an output signal on, if required, a magnified scale.

The casing is provided with a vent hole 12 (see FIG. 2) through which any fluid passing between the convolutions of the spring can escape to atmosphere. A logic element operating as a "NOR" unit is diagrammatically illustrated in FIGURE 4, whilst FIGURES 5, 6 and 7 illustrate diagrammatically the way in which a number of the units can be assembled together in a "FLIP-FLOP," "OR" gate and "AND" gate respectively, deflection of the spring being in each case brought about by deflection of a diaphragm under a momentary increase in pressure.

Although the logic element illustration is shown fitted with a single valve in the form of a closely wound helical spring, more than one for example, two such valves may be used both engaging the diaphragm in which case opening 10a and 11 will be duplicated.

Furthermore although simple types of restrictors 4 are shown, each restrictor may take the form of a spring diode, i.e. a closely wound coil spring open at one end and closed at the opposite end, the pressure fluid entering the open end and extending the spring and opening the convolutions to allow the flow of fluid, the spring forming therefore a non-return valve or diode. Such a diode 14 is shown in FIG. 10 (replacing the restriction 4 of FIG. 3).

In the arrangement of FIGURE 5, two units are coupled together to operate as a bistable flip-flop logic element. The helical springs 1, 1', of the two units are coupled to a common air supply via respective restrictions 4, 4'. The output connection of the left hand unit is coupled to an input connection of the right hand unit and fluid supplied via this coupling is applied via restrictions 4''' to the diaphragm 8'. Similarly, the output connection of the right hand unit is coupled to an input of the left hand unit and fluid is supplied via restrictions 4'' to diaphragm 8. Reset and set input signals are applied to the other input connections of the left and right hand units respectively, via similar restrictions 4'', 4'''.

In the "OR" gate configuration of FIGURE 6, two units are coupled together, the output connection of the left hand unit being connected to the input connection of the right hand unit, and any output signal from the left hand unit in response to input signals A or B applied to the input connections of the left hand unit, via restrictions 4'', results in the application of an input signal to the diaphragm 8' of the right hand unit via restriction 4''', to produce an output signal from the output connection of the right hand unit.

In FIGURE 7, an "AND" gate configuration of three units is shown, each unit having a separate air supply and the output connection of each left hand unit being coupled to a respective input connection of the right hand unit. With such an arrangement, signals A and B applied to the left hand units produce signals at the output connections thereof which are applied to the input connections of the right hand units via restrictions 4''', to provide an output signal at the output connection of the right hand unit. The springs, arms and diaphragms of the units are designated 1, 1', 1'', 6, 6', 6'', and 8, 8', 8'', as shown in FIGURE 7, with the input restrictions for the left hand units designated 4'' and the restrictions for the right hand unit being designated 4'''.

FIGURE 8 is a modification of the unit shown in FIGURE 3 where instead of an output signal being produced in response to an increase in pressure at the input, a fall in pressure constitutes the input signal. This causes the return spring 20 of the diaphragm to deform the close-coiled helical spring 1 thereby causing the pressure at output connection 11 to fall.

In the arrangement of FIGURE 9, the helical spring 1 is closed at the top and the application of an input signal to one or other or both of the input connections via restrictions 4, causes an axial deformation of the spring, thereby producing an output signal at output connection 11.

I claim:

1. A fluid pressure actuated logic element comprising a casing containing a flexible diaphragm means closing a chamber having at least one inlet connection for the entry of fluid at a predetermined pressure and via a restriction, said casing including at least one valve outside of the diaphragm chamber, said valve comprising a closely wound helical spring closed at one end and open at the other end for entry of fluid at a predetermined pressure, an input line comprising a restrictor connected to the open end of said spring control valve, an output connection for said element leading off of said input line, said spring being mounted cantilever fashion adjacent its open end with the closed end thereof adjacent to said diaphragm so as to be laterally deflected to open the convolutions thereof in response to flexure of the diaphragm consequent upon an input signal in the form of a change in the pressure applied to at least one of the inlet connections to thereby produce an output signal from said output connection of the element in response to a change in internal pressure in the spring or springs brought about by the opening of the convolutions and the consequent change in pressure in said output line.

2. A fluid pressure actuated logic element as claimed in claim 1 comprising means to feed fluid under pressure to said inlet connections and means to feed fluid to said output connections via the helical springs at a greater pressure than the fluid fed to said inlet connections.

3. A fluid pressure actuated logic element as claimed in claim 1, wherein said diaphragm of the element is normally suspended, said input comprising means for reducing the pressure within the diaphragm casing.

4. A logic element as claimed in claim 1, wherein said output connection leading off said input line is positioned downstream of the restrictor.

5. A logic element as claimed in claim 1 wherein at least one of said restrictors is a spring diode.

6. A logic element as claimed in claim 1 wherein said closed end of the spring valve carries an extension for engagement by said diaphragm.

7. A fluid pressure actuated logic element in the form of a self-contained "NOR" unit, said unit comprising a casing having a chamber closed by a flexible diaphragm and a plurality of fluid inlet connections all leading to said chamber, at least one control valve in said casing outside of said chamber, said control valve taking the form of a closely wound helical spring having a free, closed end and an open end and being mounted in said casing cantilever fashion adjacent its open end, an input line comprising a restrictor connected to the open end of said spring control valve, a branch output connection for said element leading off of said input line downstream from the restrictor, said spring valve being positioned with the closed end thereof adjacent to said diaphragm so as to be laterally deflected to open the convolutions thereof in response to flexure of the diaphragm consequent upon one of the inlet connections receiving an input signal in the form of a fluid pressure pulse, to thereby, due to deflection and opening of the convolutions of the spring, produce a change in internal pressure in said spring, constituting an amplified output signal in said branch outlet connection from said spring.

References Cited

UNITED STATES PATENTS

| | | | |
|---|---|---|---|
| 2,638,925 | 5/1953 | Monahan | 137—655 |
| 3,151,628 | 10/1964 | Heckert | 137—500 |

RICHARD B. WILKINSON, Primary Examiner

LAWRENCE R. FRANKLIN, Assistant Examiner

U.S. Cl. X.R.

251—61